United States Patent
Conway, Jr. et al.

(10) Patent No.: US 6,485,185 B1
(45) Date of Patent: Nov. 26, 2002

(54) BEARING SEAL

(75) Inventors: Daniel T. Conway, Jr., Richmond, VA (US); Paul G. Steets, Marlton, NJ (US); Michael E. Paul, Cecilia, KY (US); Paul R. Price, Glendale, KY (US); Timothy K. Chu, Elizabethtown, KY (US)

(73) Assignee: Roller Bearing Industries, Inc., Richmond, VA (US)

( * ) Notice: Subject to any disclaimer, the term of this patent is extended or adjusted under 35 U.S.C. 154(b) by 0 days.

(21) Appl. No.: 09/639,233

(22) Filed: Aug. 16, 2000

Related U.S. Application Data

(60) Provisional application No. 60/148,689, filed on Aug. 16, 1999.

(51) Int. Cl.[7] .............................................. F16C 33/80

(52) U.S. Cl. ........................ 384/484; 384/480; 384/488

(58) Field of Search ................................ 384/571, 480, 384/484, 486, 488

(56) References Cited

U.S. PATENT DOCUMENTS

| | | |
|---|---|---|
| 3,937,539 A | 2/1976 | Jones et al. |
| 4,043,620 A | 8/1977 | Otto |
| 4,054,999 A | 10/1977 | Harbottle |
| 4,150,468 A | 4/1979 | Harbottle |
| 4,203,635 A | 5/1980 | Reiter |
| 4,235,485 A | 11/1980 | Reiter |
| 4,325,591 A | 4/1982 | Otto |
| 4,336,971 A | 6/1982 | Reiter |
| 4,341,071 A | 7/1982 | Clapp |
| 4,399,998 A | 8/1983 | Otto |
| 4,428,630 A | 1/1984 | Folger et al. |
| 4,448,461 A | 5/1984 | Otto |
| 4,512,525 A | 4/1985 | Cameron |
| 4,541,738 A | 9/1985 | Leibensperger et al. |
| 4,571,097 A | 2/1986 | Lee et al. |
| 4,770,424 A | 9/1988 | Otto |
| 4,770,548 A | 9/1988 | Otto |
| 4,799,808 A | 1/1989 | Otto |
| 4,800,652 A | 1/1989 | Ballas et al. |
| 4,808,012 A | 2/1989 | Otto |
| 4,819,949 A | 4/1989 | Otto |
| 4,842,100 A | 6/1989 | Cameron et al. |
| 4,900,166 A | 2/1990 | Candiard |
| 4,938,615 A | 7/1990 | Baker |
| 4,960,335 A | 10/1990 | Otto et al. |
| 5,009,523 A | 4/1991 | Folger et al. |
| 5,017,025 A | 5/1991 | Williams |
| 5,021,035 A | 6/1991 | Zhou |
| 5,022,659 A | 6/1991 | Otto |
| 5,024,449 A | 6/1991 | Otto |
| 5,028,152 A | 7/1991 | Hill et al. |
| 5,037,214 A | 8/1991 | Dougherty |
| 5,085,519 A | 2/1992 | Dougherty |
| 5,121,998 A | 6/1992 | Bhatia |
| 5,125,156 A | 6/1992 | Witte |
| 5,129,744 A | 7/1992 | Otto et al. |
| 5,203,391 A | 4/1993 | Fox |
| 5,209,499 A | 5/1993 | Ruff, Jr. et al. |
| 5,386,630 A | 2/1995 | Fox |
| 5,411,335 A | 5/1995 | Driver |
| 5,440,184 A | 8/1995 | Samy et al. |
| 5,454,647 A | 10/1995 | Otto |
| 5,458,420 A | 10/1995 | Otto |
| 5,462,367 A | 10/1995 | Davidson et al. |
| 5,470,157 A | 11/1995 | Dougherty et al. |

(List continued on next page.)

*Primary Examiner*—Lenard A. Footland
(74) *Attorney, Agent, or Firm*—Banner & Witcoff, Ltd.

(57) ABSTRACT

A seal for use with a tapered roller bearing includes a seal affixed to a first seal support, and comprises an inner sealing member in contact with a second seal support, an outer sealing member extending toward and contacting the second seal support, and a central sealing member extending toward but not contacting the second seal support. A rain shield covering a gap between the first and second seal supports may also be included.

24 Claims, 2 Drawing Sheets

U.S. PATENT DOCUMENTS

| | | |
|---|---|---|
| 5,488,871 A | 2/1996 | Harbottle et al. |
| 5,494,358 A | 2/1996 | Dougherty |
| 5,553,870 A | 9/1996 | Czekansky et al. |
| 5,609,456 A | 3/1997 | Joki |
| 5,662,445 A | 9/1997 | Harbottle et al. |
| 5,711,616 A | 1/1998 | Gassmann et al. |
| 5,722,664 A | 3/1998 | Otto |
| 5,735,612 A | 4/1998 | Fox et al. |
| 5,755,323 A | 5/1998 | Zahn et al. |
| 5,813,675 A | 9/1998 | Otto |
| 5,816,711 A | 10/1998 | Gingrich |
| 5,842,100 A | 11/1998 | Yanashima et al. |
| 5,887,984 A | 3/1999 | Duval |
| 5,893,648 A | 4/1999 | Smith |

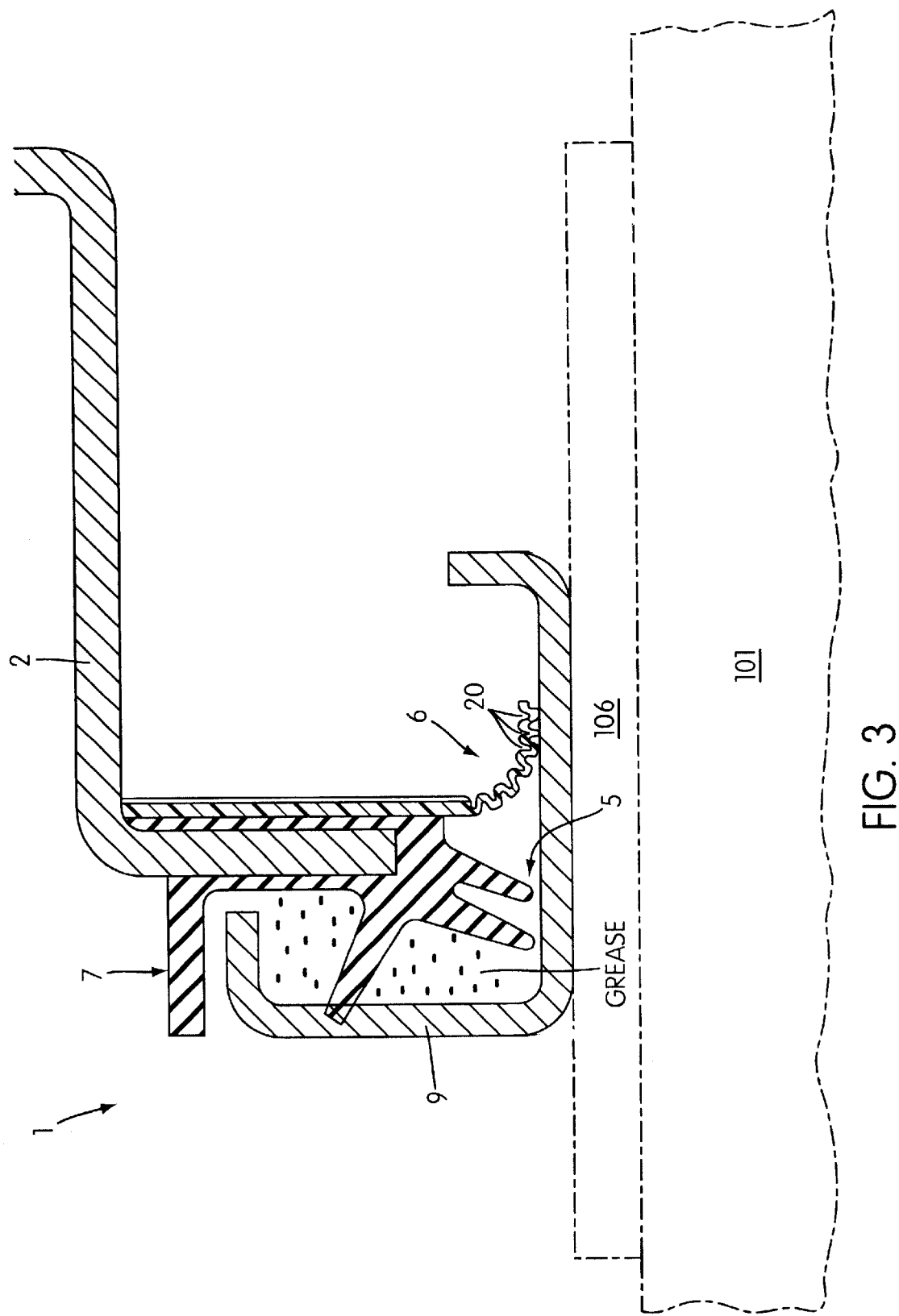

BEARING SEAL

This application claims priority to co-pending U.S. Provisional Application Serial No. 60/148,689, filed Aug. 16, 1999, to Conway, Jr., et al.

FIELD OF THE INVENTION

The present invention relates generally to bearing assemblies and in particular to devices and methods for sealing bearing assemblies used in railway vehicles or other similar applications. Bearing assemblies allow a wheel to rotate relative to a shaft (also called an axle journal). Bearing assemblies are often sealed to maintain a lubricant within the bearing assembly and to prevent dirt, sand, and moisture to enter the bearing assembly. The seal is typically formed of an annular rubber lip seal which rotates about the shaft.

DESCRIPTION OF THE RELATED ART

Referring to FIG. 1, a conventional embodiment of a seal 200 for a bearing assembly 100 is shown. The bearing assembly 100 may include, for example, a journal shaft 101 supporting a wear ring 106, an inner race 103, and a backing ring 102. The inner race 103, may support, for example, a tapered roller bearing 105 and a outer race 104. Sealing the grease in the tapered roller bearing is a seal 200 including an upper seal support 202, a lower seal support 209, and a plurality of rubber projections which include: a inner rubber seal 203 having grease seal portion 206, a dust seal 205, and a non-contact side seal 204. The prior art, however, suffers from a number of deficiencies including a propensity for moisture to enter the bearings and degrade the seal.

Accordingly, there exists a need for an improved bearing seal which reduces torque, i.e., is a low-torque seal, while at the same time maintaining the high reliability normally associated with higher torque seals.

SUMMARY OF THE INVENTION

Aspects of the present invention overcome one or more of the above-mentioned problems by using improved seal assemblies and/or approved sealing surfaces and/or materials. For example, an aspect of the present invention utilizes a polymeric main seal such that grease is permanently sealed in the tapered roller bearings. In the most preferred embodiments, a Teflon or PTFE is utilized to provide the main seal. The main seal may extend horizontally from a upper seal support and contact and ride along an extended portion of a horizontal lower seal support.

In other aspects of the present invention, a rain shield is provided over the gap between the upper seal support and the lower seal support. In still further aspects of the invention, a side seal is a contact side seal which runs and/or contacts the vertical surface of the lower seal support. In still further aspects of the invention, a non-contact seal is provided which rotates spaced from the surface of the a horizontal surface of the lower seal support. The non-contact seal may include two closely spaced fingers or times having lengths substantially longer than widths. This improves resiliency of tines, improving reliability.

These and other features of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in the art of roller bearing seals, theory and design in light of the present specification, that alternate combinations and subcombinations of one or more aspects of the present invention, either alone or in combination with one or more elements and/or steps defined herein, may be utilized as modifications or alterations of the invention or as part of the invention. It is intended that the written description of the invention contained herein cover all such modifications and alterations. For example, in alternate aspects of the invention, the seal may include one or more of the water shield, the non-contact shield, the contacting side seal and/or the grease seal in any combination or subcombination.

BRIEF DESCRIPTION OF THE DRAWINGS

The present invention will be described in more detail with reference to preferred embodiments of the invention, given only by way of example and not by way of limitation, and illustrated in the accompanying drawings in which:

FIG. 3 is an expanded view of the invention illustrated in FIG. 2.

DETAILED DESCRIPTION OF PREFERRED EMBODIMENTS

Figure 1:
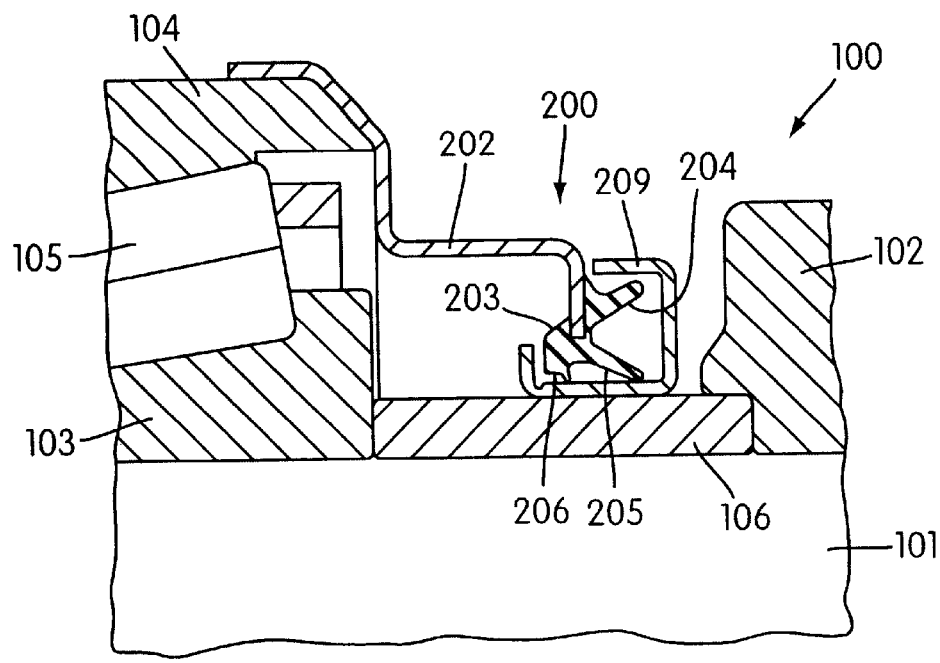
FIG. 1 illustrates a conventional seal assembly.
Figure 2:
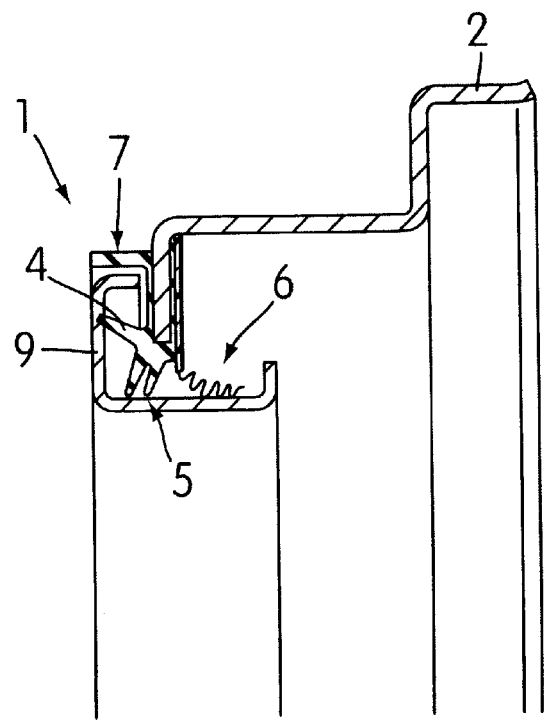
FIG. 2 illustrates a seal in accordance with the present invention which is compatible with the bearing of FIG. 1.

Referring to FIG. 2, a seal 1 may be formed such that it is compatible with the tapered roller bearing assembly including the tapered roller bearing 105, outer race 104, inner race 103. Journal shaft 101, wear ring 106, and backing ring 102 of FIG. 1. The one aspect of the invention as illustrated in FIG. 2, the seal 1 may include, for example, an upper support seal 2 opposed to a lower seal support 9. The upper seal support 2 may include a water shield 7. The water shield may be any configuration, but is preferably formed of a rubber compound and extends horizontally out of a vertical surface of the upper seal support 2. Alternatively, other configurations are possible such as the watershield being on lower seal support 9 and covering in the lower seal support 9 and the upper seal support 2, and extending horizontally from the horizontal portion of the upper seal support 2. However, where the lower seal support rotates, it is preferred to have the water shield 7 on the upper seal support 2, and extending over the space between the lower seal support 9 and the upper seal support 2. The rain shield is preferably made from a rubber compound such as NITRO, for example, manufactured by Paulstra. The rain shield has the beneficial effect of preventing moisture build up from occurring within the seal and early failure of the seal. The seal 1 may also include side seal 4 disposed such that is in tight contact with lower seal support 9 extending from a vertical portion of the upper seal support 2. A tight contact between the side seal 4 and the vertical portion of the lower seal support 9 has the beneficial effect of substantially reducing moisture buildup under the side seal 4. Additionally, the lower moisture build up allows for the sealing surfaces of the finger-like tines on the non-contact seal 5 to be slightly spaced from the lower seal support 9. In this manner, the non-contact seal 5 can serve as a dust trap while substantially reducing the torque of the overall bearing seal. In exemplary embodiments, the tines of non-contact seal 5 may be the same length and/or spaced a uniform distance from lower seal support 9. However, where the tines are different lengths and/or different distances from the lower seal support 9 (e.g., the outer tine longer than the inner tine) a more effective seal results. Grease seal 6 may be formed of a PTFE material which forms the main barrier seal of seal 1. The PTFE seal may be corrugated such as shown in FIG. 2 and FIG. 3.

Referring specifically to FIG. 3, a more detailed description of the seal 1 in accordance with aspects of the present invention is shown. This embodiment is substantially similar to the embodiment shown in FIG. 2 and will not be described in further detail.

In exemplary embodiments of the invention, a highly reliable and efficient seal is provided without the need for a garter spring which substantially increases the torque of the seal. The grease seal 6 provides a highly efficient seal while at the same time providing a very low torque. This torque can even be further reduced by the use of channels in the primary seal 6. These channels, in addition to reducing the contact area between the primary seal 6 and the lower seal support 9, also serve to channel grease and lubrication across the entire length of the PTFE seal 6. Thus, even though the seal may occupy an extended horizontal surface of the lower support 9, the channels provide a very low torque on the overall seal assembly.

While exemplary systems and methods embodying the present invention are shown by way of example, it will be understood, of course, that the invention is not limited to these embodiments. Modifications may be made by those skilled in the art, particularly in light of the foregoing teachings. For example, the upper and lower seal shown in FIG. 3 may be inverted in appropriate circumstances. Additionally, by slight modifications, it may be arranged such that the lower seal support and the upper seal support are either stationary and/or rotate. Other materials may be used other than those disclosed herein, particularly with respect to the polymeric PTFE seal 6. However, it has been found that the PTFE material provides substantial reduction in seal torque.

We claim:

1. A seal assembly for use with a tapered roller bearing, the seal assembly comprising: an upper seal support with a vertically extending portion, a lower seal support having a horizontally extending portion and a vertically extending portion, and a seal coupled to the vertically extending portion of the upper seal support and having a corrugated portion extending vertically down and curving along the horizontally extending portion of the lower seal support, the seal assembly being configured for coupling to the tapered roller bearing.

2. The seal assembly of claim 1 wherein the seal is formed of a PTFE material.

3. The seal assembly of claim 1 wherein the seal further comprises a portion extending toward and contacting the vertically extending portion of the lower seal support.

4. A seal assembly configured for use with a tapered roller bearing, the seal assembly comprising:
   first seal support with a vertically extending portion;
   a second seal support having a horizontally extending portion and a vertically extending portion; and
   a seal coupled to the vertically extending portion of the first seal support, the seal comprising:
      a first seal member curving along the horizontally extending portion of the second seal support, and
      a second seal member extending toward and contacting the vertically extending portion of the second seal support, wherein the seal further comprises a non-contact seal member extending toward but not contacting the second seal support and located between the first and second seal members.

5. The seal assembly of claim 4 wherein the seal assembly lacks a garter spring.

6. The seal assembly of claim 5, further comprising a horizontally extending rain shield covering a gap between the first and second seal supports.

7. The seal assembly of claim 4 wherein the seal comprises a PTFE material.

8. The seal assembly of claim 4, further comprising a horizontally extending rain shield covering a gap between the first and second seal supports.

9. The seal assembly of claim 8, wherein the rain shield is affixed to the first seal support and rotatable relative to the second seal support.

10. The seal assembly of claim 8, wherein the rain shield is affixed to the second seal support and rotatable relative to the first seal support.

11. The seal assembly of claim 8, wherein the rain shield comprises a rubber compound.

12. The seal assembly of claim 8, wherein the first seal member is corrugated.

13. The seal assembly of claim 12, wherein the non-contact seal member comprises at least two tines.

14. The seal assembly of claim 13, wherein one of the at least two tines is separated from the second seal support by a greater distance than the other of the at least two tines.

15. The seal assembly of claim 4, wherein the first seal member is corrugated.

16. The seal assembly of claim 4, wherein the non-contact seal member comprises at least two tines.

17. The seal assembly of claim 16, wherein one of the at least two tines is separated from the second seal support by a greater distance than the other of the at least two tines.

18. A seal assembly configured for use in a tapered roller bearing journaling a shaft with an axis of rotation, comprising:
   a first seal support having a radial portion extending generally perpendicular to the axis;
   second seal support having an axial portion extending generally parallel to the axis and a radial portion extending generally perpendicular to the axis; and
   a seal coupled to the radial portion of the first seal support, the seal having an inner sealing member in contact with and curving along the axial portion of the second seal support, a central sealing member extending toward but generally not contacting the second seal support, and an outer sealing member in contact with the radial portion of the second seal support.

19. The seal assembly of claim 18 wherein the inner sealing member is corrugated.

20. The seal assembly of claim 18 further comprising a rain shield covering a gap between the first and second seal supports.

21. The seal assembly of claim 18 wherein at least one of the sealing members comprises a PTFE material.

22. The seal assembly of claim 21 wherein the inner sealing member is corrugated.

23. The seal assembly of claim 22 further comprising a rain shield covering a gap between the first and second seal supports.

24. The seal assembly of claim 23 wherein the rain shield comprises a rubber compound.

* * * * *